Aug. 26, 1930.  C. E. WEBBER  1,774,463
WHEEL LUG CLEANING DEVICE
Filed Dec. 18, 1929  2 Sheets-Sheet 1
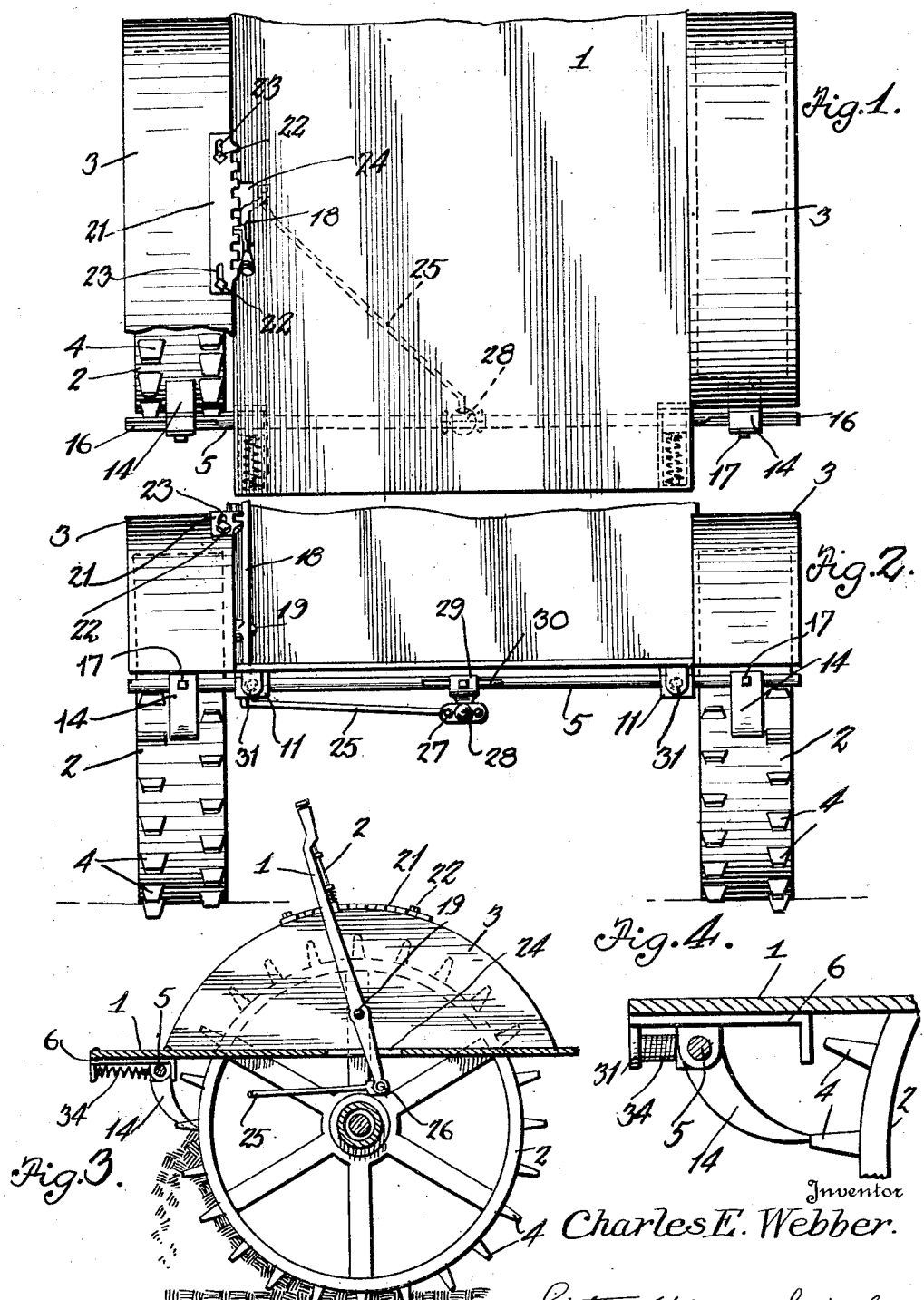

Aug. 26, 1930.         C. E. WEBBER         1,774,463
WHEEL LUG CLEANING DEVICE
Filed Dec. 18, 1929          2 Sheets-Sheet 2
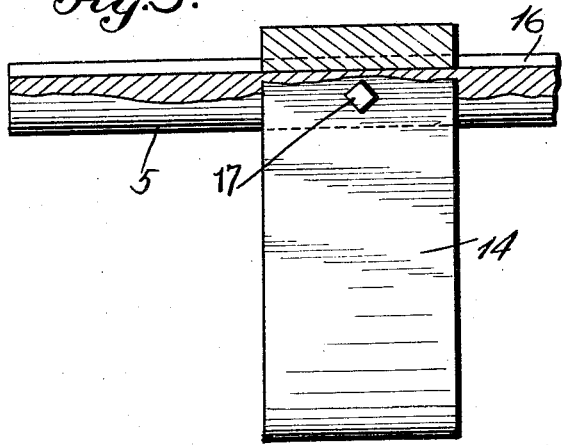
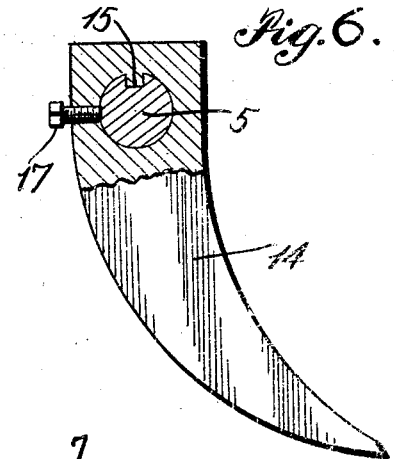
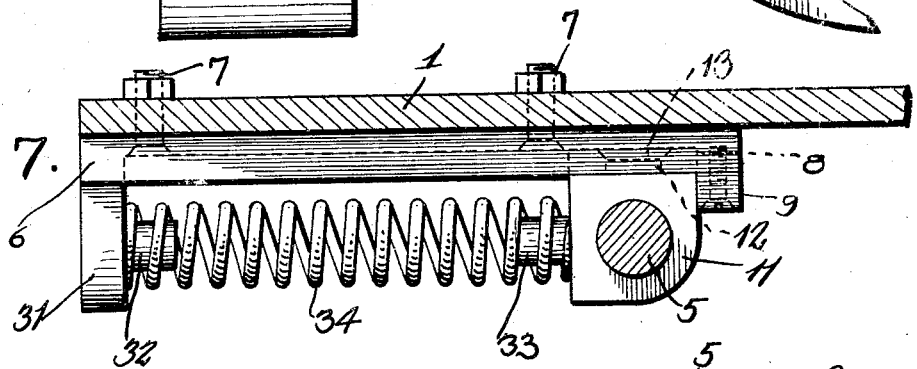
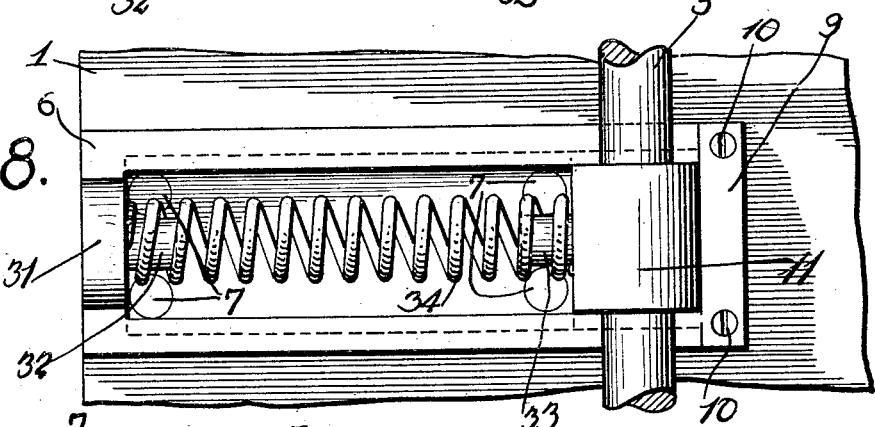
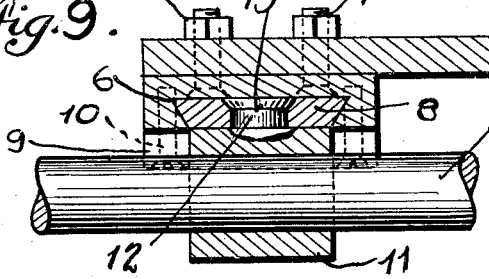
Inventor
Charles E. Webber.
By Linton Kellogg Smith
Attorneys.

Patented Aug. 26, 1930

1,774,463

UNITED STATES PATENT OFFICE

CHARLES E. WEBBER, OF PONTIAC, ILLINOIS

WHEEL-LUG-CLEANING DEVICE

Application filed December 18, 1929. Serial No. 415,076.

This invention relates to improvements in devices for cleaning or freeing the traction lugs of the wheels of tractors and like motor driven vehicles from mud and such other foreign matter as may accumulate upon or adhere thereto during its traversing of a surface, whereby to ensure and to maintain the working efficiency thereof, the invention having for an object to provide a device of this character which may be conveniently and readily attached to a tractor frame without alteration thereto and which, may be operated by the tractor operator, at will.

It is also an object of the invention to provide the device with a novel and highly advantageous form of mounting for the wheel lug cleaners, so operable that in event of undesirable shifting movement of the same with relation to the wheel treads and their engagement with the tractor lugs when moved into operative positions, the continued orbital-like movement of the lugs will cause the cleaners to be automatically moved to inoperative positions with respect to said lugs, hence, permitting their free passage by the cleaners and by consequence, preventing the damaging of the same or the mounting therefor, as well as the traction lugs.

Another and equally important object of the invention is to so mount the cleaner supporting shaft and the cleaners upon the opposite portions of said shaft, that in event of undesirable engagement of one thereof with the wheel lugs, the shaft will be allowed to automatically adjust itself to compensate for the one sided lateral stressing of the same and simultaneously, the cleaner having said undesirable engagement with the wheel lugs, will be permitted to have slidable adjustment upon that portion of the shaft carrying it in order to compensate for the angular shifting or moving of the shaft, thereby, preventing damaging or distortion of the cooperating parts.

Other objects of the invention will be in part obvious and in part pointed out hereinafter.

In order that the invention and its mode of operation may be readily understood by persons skilled in the art, I have, in the accompanying illustrative drawings, and in the detailed following description based thereon, set out several possible embodiments of the same.

In these drawings:—

Figure 1 is a fragmentary top plan view of a tractor with my improved wheel lug cleaning device attached thereto, a portion of one of the tractor wheel fenders being broken away to illustrate the manner in which the adjacent wheel lug cleaner is adapted to be operatively engaged with the wheel tread;

Figure 2 is a fragmentary rear end elevation of a tractor equipped with the invention;

Figure 3 is a fragmentary vertical longitudinal section through the rear end portion of a tractor equipped with the invention, showing one of the cleaner lugs in operative engagement with the tread of the tractor wheel and between the wheel lugs;

Figure 4 is an enlarged fragmentary detail, partly in section, illustrating the inoperative position automatically taken by either one of the wheel lug cleaners in event of undesirable engagement of the same with the adjacent wheel lugs;

Figure 5 is a fragmentary detail, partly in section, illustrating one of the wheel lug cleaners and the manner in which the same is mounted upon the adjacent portion of the mounting shaft provided therefor;

Figure 6 is a similar view taken at substantially right angles and in section, with respect to the view shown in the Figure 5;

Figure 7 is a detail, mainly in side elevation but partly in section, illustrating one of the slidable bearings for the lug cleaner mounting shaft;

Figure 8 is a fragmentary plan view of the bearing and its mounting showing the manner in which the bearing mounting is secured to an adjacent portion of the tractor frame or the flooring thereof, and Figure 9 is an enlarged fragmentary detail, partly in section, illustrating the engagement of a portion of the mounting shaft in one of the bearings provided therefor and the pivotal and slidable mounting of said bearing with respect to the tractor frame or flooring.

Having more particular reference to the drawings, in connection with which like characters of reference will designate corresponding parts throughout, I have shown for purposes of illustration herein, the invention as being adapted to a tractor machine wherein the frame and flooring of the machine or tractor is generally indicated by the numeral 1, the driving wheels thereof by the numeral 2 and the wheel fenders or guards by the numeral 3; it being understood by workers skilled in this art, that the tread portions of the two driving wheels are equipped with circumferentially disposed series of traction lugs 4, said lugs being mounted in relatively alternate fashion upon their particular wheel treads and being so positioned as to provide a path or clearance therebetween, as is well shown in the Figures 1 and 2.

It is highly desirable that the treads of the driving wheels and the traction lugs 4 thereof shall be maintained free of mud or other accumulations which, during operation of the tractor, would tend to detract from its properties of traction. It is for this purpose, that I provide my improved tractor wheel lug cleaning device, which, in the present embodiment, may be stated to consist of a mounting shaft 5 adapted to be disposed transversely of a portion of the tractor frame or bottom 1 in proximity to the normally rearward sides of the driving wheels 2, as is shown in the accompanying drawings; bearing brackets being provided for effecting transverse rotatable mounting of the shaft 5 adjacent the underside of the tractor machine flooring 1 and comprising bed plates, formed of cast or malleable metal, indicated herein by the numeral 6. These bed plates 6 are adapted to be longitudinally positioned with respect to the opposite sides of those portions of the tractor machine flooring 1 in proximity to the normally rearward sides of the driving wheels 2 and are secured in position adjacent said under side or portions of the flooring 1 by passing bolts 7, or other suitable fastening devices, through openings formed in appropriate portions of the plates 6 and through other appropriate openings formed in the proper portions of the flooring 1, whereupon nuts or other securing devices are turned into engagement with their screw threaded extremities. In this way, a detachable connection is effected as between the bed plates 6 and the flooring 1 and because of this, it will be understood that said plates, may, as required, be removed therefrom; furthermore, that the plates may be attached to the flooring 1 or the tractor frame, without any alteration thereto other than the drilling or forming of openings for receiving the securing bolts 7 therethrough.

Each of the bed plates 6, of which there are preferably two (one upon either side of the flooring 1) is formed with longitudinally disposed dove-tailed grooves or ways, certain of the ends of which open onto the marginal portions of the plates 6. Into these longitudinally disposed dove-tailed grooves or ways in the bed plates 6, dove-tailed carriage blocks 8 are slidably introduced by way of those ends of the grooves opening onto certain of the marginal portions of the bed plates, whereupon abutment bars or pieces 9 are engaged transversely over those ends of the bed blocks onto which the dove-tailed grooves open, and are secured in position through the medium of machine screws or other suitable fastening devices 10, thus closing the open ends of the grooves and consequently, preventing slidable displacement of the dove-tailed carriage blocks 8 from their respective bed plates 6.

To rotatably and slidably support the transversely disposed mounting shaft 5 with respect to the flooring or frame 1 of the tractor machine equipped with the invention, I provide each of the carriage blocks 8 with bearings 11, pivotally connecting these bearings 11 to their respective blocks 8 through the medium of pivot pins or rivet-like devices 12, certain of the ends of which are fixedly embedded in the normally inner sides of the bearings 11, while the remaining ends thereof are engaged through their particular dove-tailed carriage blocks 8 and are upset or swaged as at 13, whereby to prevent disengagement of the bearings 11 from said carriage block and yet, permit of relative pivotal movement as between the bearings 11 and the blocks 8. The transverse mounting shaft 5 is slidably and rotatably received, as aforesaid, in these bearings 11, being positioned in that manner as is shown in the Figures 1, 2 and 3.

Wheel lug cleaners, consisting of inwardly disposed and curved fingers 14, formed of metal or other suitable material are provided the device and as will be noted, these cleaners in addition to being curved upon themselves and normally inwardly disposed, are tapered throughout their respective lengths, the normally upper ends thereof being thickened and being formed with transversely disposed bearing openings of a size and shape such as will permit of their snug yet slidable engagement over the opposite end portions of the mounting shaft 5, in the manner as is shown in the Figures 2, 5 and 6. In order that these cleaners 14 may have fixed connection with the mounting shaft 5 and will be caused to rotate or move therewith, each of the cleaners is provided with key-like projections or fingers 15 within the openings formed therein and these projections 15 are adapted to have sliding engagement in ways or grooves 16 formed in the opposite end portions of the mounting shaft 5. Thus, it will be seen that with the slidable engagement of the cleaners 14 over the opposite end portions of the mounting shaft 5, an effectual splining as between said shaft and the cleaners 14 is effected. Furthermore, as a means for effecting the locking, under normal conditions, of the several cleaners 14 in adjusted or predetermined positions upon their respective portions of the mounting shaft 5, I engage lag or set screws 17 through screw threaded openings formed in appropriate portions of the thickened ends of each of the cleaners 14, these openings being so disposed that with the inward turning of the set screws 17, their inner extremities will have binding engagement with adjacent portions of the shaft 5 and thus, by regulating the pressure of engagement of the inner ends of said screws 17 upon the adjacent portions of the shaft 5, it will be understood that a locking positioning, of predetermined resistance, will be effected as between the cleaners 14 and the shaft 5. Because of this, under normal conditions, the cleaners 14 will be prevented from having longitudinal shifting or sliding movement over or with respect to those portions of the mounting shaft 5 receiving the same. In this connection, it may be stated at this time, that the normal positioning of the cleaners 14 upon the mounting shaft is such that the free or reduced and normally inner ends of the cleaners will have engagement with those portions of their respective driving wheel treads between the peripherally disposed series of traction lugs 4, after the fashion as is clearly illustrated in the Figures 1 and 2. Thus, with rotation of the driving wheel 2 by the cleaners 14, and assuming that said cleaners have been moved to their operative positions with respect to the wheel treads, it will be seen that the free ends thereof will be received in that path which is provided upon the wheel treads between the aforesaid series of lugs 4 and therefore, that with such movement and such engagement, the cleaners will serve as a means for scraping or similarly removing mud, débris or other foreign matter collected upon the wheel treads as they traverse a surface.

That rocking or operative movement may be transmitted to the mounting shaft 5 by an operator of the tractor equipped with the invention, I mount upon an appropriate portion of said tractor and in this particular embodiment of the invention, upon the inner side of one of the wheel fenders 3, an operating lever 18, as at 19. The upper or handle portion of this lever is provided with the usual spring pressed pawl 20 which is adapted to be selectively engaged between any of the teeth of a segment 21 mounted upon the upper side of said fender 2 by the passage of connecting or mounting bolts 22, through slots 23 formed in the opposite extremities thereof. At this point, it is to be noted that by reason of the engagement of the securing bolts 22 in the slots 23 of the toothed segment 21, shifting or adjusting movement of such segment will be permitted in order that the device may be effectually mounted. The lower end of the operating lever 18 extends through a way 24 formed in an adjacent portion of the flooring or frame 1, as is shown in the Figure 3 and has an angularly formed rearwardly disposed connecting rod 25 pivoted thereto as at 26, the remaining end of said rod being connected to a fitting or arm 27 which in turn, is connected through an ordinary ball and socket joint, such as indicated by the numeral 28, to the free end of an arm 29 splined to a slotted intermediate portion 30 of the mounting shaft 5, as is shown in the Figures 1 and 2. Because of this particular arrangement and construction, it will be understood that by rocking the operating lever 18, rocking motion will be imparted therefrom, by way of the connecting rod 25 and the arm 29, to the mounting shaft 5 and therefore, that the cleaners 14 carried upon the opposite end portions of said shaft may be selectively brought into or out of engagement with the tread portions of the driving wheels 2 of the tractor machine. By engaging the pawl 20 of the operating lever 18 in the particularly chosen notch of the toothed segment 21, the adjusted positioning of the rocker shaft 5 may be retained.

Whereas means are provided through the medium of the operating lever 18 and those mechanical instrumentalities associated therewith, for transmitting rocking motion to the shaft 5, it is furthermore desirable, as hereinbefore inferred, that said shaft 5 shall be permitted to have longitudinal sliding movement with relation to the flooring 1, under certain conditions, and this is afforded through the medium of the bearings 11 which are slidably mounted in the longitudinally disposed dove-tailed shaped ways or grooves of the several bed plates 6. However, it is desirable that the slidably mounted bearings 11 shall be normally maintained in certain predetermined positions, that is, in positions whereat the shaft 5 will be so positioned with respect to the rearward sides of the tractor wheel treads that with rocking of the shaft 5, the free ends of the cleaners 14 will be permitted to be brought into scraping or cleaning engagement with these wheel treads. To effect this, certain of the ends of each of the bed plates 6 are provided with rigidly mounted ears or lugs 31 extending downwardly and at right angles therefrom and carrying bosses or pins 32 upon their inner sides, while the adjacent sides of each of the bearings 11 are provided with fixedly mounted and complementally disposed bosses or pins 33. Expansible coiled springs 34 are adapted to be engaged between the ears 31 and the bearings 11, the outer convolutions of each end of the springs engaging over the bosses or pins 32 and 33, in the fashion as is shown in the Figures 7 and 8. Hence, it will be seen that these springs will normally impart an outward urge of movement to their respective bearings 11 and that because of this, said bearings will be retained at the extreme ends of the dove-tailed grooves in the several bed plates 6 and particularly, in abutting engagement with the stop bars or abutments 9, hereinbefore described. Because of this mounting and normal positioning of the bearings 11, it will be understood that they will be retained in positions whereat the mounting shaft 5 carried thereby will be so positioned as to permit of engagement of the free ends of the cleaners 14 with the driving wheel treads upon adjustment or rocking of the shaft 5 in the proper direction and to the desired extent through the medium of the operating lever 18. However, under certain abnormal conditions, it will be seen that inward sliding movement of the bearings 11 through the dove-tailed slots or ways of the bed plates 6, against the tension of the expansible coiled springs 34, will be permitted and upon such movement, it will be furthermore understood that the shaft 5 will be allowed to move in a direction away from the rear sides of the driving wheel treads 2, for a purpose which will be subsequently described.

In operation of the improved wheel lug cleaning device, it is essential that the cleaners 14 shall be previously adjusted to proper positions with respect to the wheel lugs upon the treads of the driving wheels 2, that is, to those positions as are shown in the Figure 2. At this time, the lever 18 will occupy its inoperative position so that the mounting shaft 5 will retain the cleaners in dis-engaged positions with respect to the lugs 4. As the equipped tractor transverses a surface and it becomes necessary to remove mud, débris or other foreign matter from the treads thereof and particularly, between the lugs 4, the shaft 5 may then be rotated under the influence of the operating lever 18 to effect engagement of the cleaners 14 with the wheel treads, i. e., in that path afforded for such engagement between the series of relatively alternately positioned traction lugs 4. This engagement between the traction lug and with rotation of the driving wheels, will serve as a means to free the driving wheels of the accumulated matter and thus maintain the same at their peak of operating efficiency. Should for any reason, the cleaners 14 move from their preadjusted positions upon the opposite portions of the mounting shaft 5 to such an extent that with swinging thereof into operative positions, the free ends of one or both thereof come into contact with any of the lugs 4 upon the driving wheels 2, it will be seen that the outward stress imparted to said cleaners by the upward rotative movement of the lugs 4 engaged thereby, will be such as to move the mounting shaft 5 outwardly away from the wheel treads by reason of the slidable mounting of the bearings 11 in the dove-tailed grooves of their respective bed plates 6, such movement, of course, being against the tension of the expansible coiled springs 34. By reason of this outward movement of the bearings 11 receiving the mounting shaft 5, it will be seen, especially, upon reference to the Figure 4, that the extremities of the lug engaging cleaners 14 will be permitted to automatically disengage themselves from said lugs and permit of movement of the lugs thereby with continued rotation of the tractor wheels, up until that time when the machine may be stopped and a readjustment of the cleaners 14 with respect to the wheel treads then effected. By this means, it will be furthermore understood that breakage or damaging of the wheel lugs 4 as well as the cleaners 14 and the mounting for these cleaners, together with the operating lever 18, will be prevented.

In event that but one of the cleaners 14 should engage with the lugs 4 of the adjacent driving wheel, as through shifting or other undesirable movement of said cleaner upon its particular portion of the mounting shaft 5, it will be seen that that end of the shaft carrying said cleaner will be forced outwardly or rearwardly whereas the opposite end thereof carrying the remaining cleaner will remain in substantially its original or normal position. With such angular stressing of the shaft 5, attention is invited to the fact that by reason of the pivotal mounting of the bearings 11 upon their respective carriage blocks 8 through the medium of the pivot pins 12, this movement will be compensated for without breaking or distorting the shaft or the operating means therefor. Furthermore, should, during this angular or lateral stressing of one end of the mounting shaft 5, the disalined and lug engaging cleaner 14 become jammed against the lug being engaged thereby, it will be seen that the resulting stress occasioned by such engagement will be sufficient to overcome the binding or clamping connection of the set screw 17 of that particular cleaner upon the adjacent portion of the shaft 5 and thus, that said cleaner will be permitted to have movement upon the adjacent portion of the shaft 5 or if not this, then that said shaft 5 will be permitted to slide through the binding or jamming cleaner 14 and thus will compensate for this particular difficulty. It will be furthermore understood, that with angular positioning of the mounting shaft 5, in the manner just described, the arm 29 which is splined to the intermediate portion 30 of the mounting shaft 5 will be allowed to automatically slide to a compensating position upon said shaft and thereby, damaging or distortion of the connecting rod 25 and the operating lever 18 will be prevented.

When the cleaners 14 have disengaged from those lugs 4 previously engaged thereby, it will be seen that the mounting shaft 5 will be immediately returned to its normal positioning through the medium of the expansible coiled spring 34 which has bearing upon the slidably mounted bearings 11 carried by the bed plates 6.

Manifestly, the construction shown is capable of considerable modification, and such modification as is within the spirit of my claims I consider within the spirit of my invention.

I claim:—

1. A device of the character described comprising in combination, a tractor frame, tractor wheels with lugs, a transverse mounting shaft, bearings upon the tractor frame capable of movement longitudinally of the frame for supporting said shaft, lug cleaning means mounted upon the opposite portions of the shaft for engagement between the tractor wheel lugs, and manually operable means connected to said shaft for imparting rocking motion thereto, whereby to move the lug cleaning means into and out of engagement between the wheel lugs.

2. A device of the character described comprising in combination, a tractor frame, tractor wheels with lugs, a transverse mounting shaft, bearings upon the tractor frame capable of movement longitudinally of the frame for rotatably and slidably supporting said shaft, means for normally retaining said bearings in predetermined positions, lug cleaning means mounted upon the opposite portions of said shaft for engagement between the tractor wheel lugs during rotation of the wheels, and means connected to said shaft for imparting rocking motion thereto whereby to move the lug cleaning means into and out of engagement between the wheel lugs.

3. A device of the character described comprising in combination, a tractor frame, tractor wheels with lugs, a transverse mounting shaft, bearings upon the tractor frame capable of longitudinal movement of the frame for supporting said shaft, lug cleaning means mounted upon and splined to the opposite portions of said shaft for engagement between the tractor wheel lugs during rotation of the wheels, means for normally effecting connection between said lug cleaning means and said shaft but disengageable therewith with the application of predetermined stresses thereto, and means connected to said shaft for imparting rocking motion thereto, whereby to move the lug cleaning means into and out of engagement between the wheel lugs.

4. A device of the character described comprising in combination, a tractor frame, tractor wheels with lugs, a transverse mounting shaft, bearings upon the tractor frame capable of movement longitudinally of the frame for supporting said shaft, lug cleaning means mounted upon and splined to the opposite portions of said shaft for engagement between the tractor wheel lugs during rotation of the wheels, means carried by said cleaning means and engageable with adjacent portions of the mounting shaft for releasably securing the cleaning means against sliding movement upon the shaft, but operable with the application of predetermined stresses thereto to be rendered inoperative and to permit of sliding movement of said cleaning means upon the mounting shaft, and means connected to said shaft for imparting rocking motion thereto whereby to move the lug cleaning means into and out of engagement between the wheel lugs.

5. A device of the character described comprising in combination, a tractor frame, tractor wheels with lugs, a transverse mounting shaft, bearings upon the tractor frame capable of movement longitudinally of the same for rotatably and slidably supporting said shaft, means for normally retaining said bearings in predetermined positions, lug cleaning means mounted upon and splined to the opposite portions of said shaft for engagement between the tractor wheel lugs during rotation of the wheels, other means carried upon said lug cleaning means engageable with adjacent portions of the mounting shaft for effecting the releasable locking of said cleaning means to the mounting shaft, but adapted with the application of predetermined stresses thereto to be rendered inoperative for permitting of relative sliding movement between the mounting shaft and the cleaning means, and means connected to said mounting shaft for imparting rocking motion thereto whereby to move the lug cleaning means into and out of engagement between the wheel lugs.

6. A device of the character described comprising in combination, a tractor frame, tractor wheels with lugs, a transverse mounting shaft, bearings upon the tractor frame capable of movement longitudinally of the frame for supporting said shaft, other means for yieldably retaining said bearings in predetermined positions, lug cleaning means mounted upon the opposite portions of said shaft for engagement between the tractor wheel lugs during rotation of the wheels, and still other means connected to said shaft for imparting rocking motion thereto whereby to move the lug cleaning means into and out of engagement between the wheel lugs.

7. A device of the character described, comprising in combination, a tractor frame, tractor wheels with lugs, a transverse mounting shaft, bearings upon the tractor frame capable of movement longitudinally of the frame for supporting said shaft, means for yieldably retaining said bearings normally in predetermined positions, lug cleaning means mounted upon and splined to the opposite portions of said shaft for engagement between the tractor wheel lugs during rotation of the wheels, other means carried by said lug cleaning means and engageable with adjacent portions of the mounting shaft for releasably locking said cleaning means to said shaft but adapted, with the imparting of predetermined stresses thereto to be rendered inoperative and to permit of relative sliding movement between the cleaning means and the mounting shaft, and means connected to said mounting shaft for imparting rocking motion thereto whereby to move the lug cleaning means into and out of engagement between the wheel lugs.

8. A device of the character described, comprising in combination, a tractor frame, tractor wheels with lugs, a transverse mounting shaft, bearings detachably secured upon portions of the tractor frame and movable longitudinally for limited distances with respect to said frame for supporting said shaft, lug cleaning means mounted upon the opposite portions of said shaft for engagement between the tractor wheel lugs during rotation of the wheels, and means operably connected to said shaft for imparting rocking motion thereto whereby to move the lug cleaning means into and out of engagement between the wheel lugs.

9. A device of the character described, comprising in combination, a tractor frame, tractor wheels with lugs, a transverse mounting shaft, bearings detachably secured to portions of the tractor frame and movable for limited distances longitudinally thereof for supporting said shaft, means for yieldably and normally retaining the bearings in predetermined positions with respect to the tractor frame, lug cleaning means mounted upon and splined to the opposite portions of said shaft for engagement between the tractor wheel lugs during rotation of the wheels, and manually operable means connected to said shaft for imparting rocking motion thereto whereby to move the lug cleaning means into and out of engagement between the wheel lugs.

10. A device of the character described comprising in combination, a tractor frame, tractor wheels with lugs, a transverse mounting shaft, bearings mounted upon portions of the tractor frame adapted to have pivotal and limited longitudinal sliding movement with respect to said frame for rotatably and slidably supporting said shaft, lug cleaning means mounted upon the opposite portions of the shaft for engagement between the tractor wheel lugs during rotation of the wheels, and means operatively connected to said shaft for imparting rocking motion thereto whereby to move the lug cleaning means into and out of engagement between the wheel lugs.

11. A device of the character described, comprising in combination, a tractor frame, tractor wheels with lugs, a transverse mounting shaft, bearings detachably secured to portions of said tractor frame and adapted to have pivotal and limited longitudinal movement with respect to said frame for rotatably and slidably supporting said shaft, means for normally retaining said bearings in predetermined positions with respect to the tractor frame, lug cleaning means mounted upon the opposite portions of said shaft for engagement between the tractor wheel lugs during rotation of the wheels, and means connected to the shaft for imparting rocking motion thereto whereby to move the lug cleaning means into and out of engagement between the wheel lugs.

12. A device of the character described, comprising in combination, a tractor frame, tractor wheels with lugs, a transverse mounting shaft, bearings detachably secured to portions of the tractor frame adapted to have pivotal and limited longitudinal sliding movement with respect to the frame for rotatably and slidably supporting said shaft, means for normally retaining said bearings in predetermined positions with respect to said frame, lug cleaning means mounted upon and splined to opposite portions of said shaft for engagement between the tractor wheel lugs during rotation of the wheels, other means on said lug cleaning means engageable with adjacent portions of the mounting shaft for effecting the releasable locking of said cleaning means to said shaft but adapted to be rendered inoperative with the imparting of predetermined stresses thereto whereby to allow of relative sliding movement between said cleaning means and said shaft, and means connected to said mounting shaft for imparting rocking motion thereto whereby to move the lug cleaning means into and out of engagement between the wheel lugs.

13. A device of the character described, comprising in combination, a tractor frame, tractor wheels with lugs, a transverse mounting shaft, brackets for supporting said shaft secured to portions of the tractor frame in relatively spaced relation and each comprising bed plates formed with longitudinally disposed ways therein, bearings slidably engaged in said ways, stops engaged with portions of said bed plates for limiting the extent of longitudinal sliding movement of the bearings in said ways, expansible coiled springs interposed between said bearings and fixed portions of said bed plates, said bearings being adapted to rotatably and slidably support said mounting shaft, lug cleaning means mounted upon and splined to the opposite portions of said shaft for engagement between the tractor wheel lugs during rotation of the wheels, means on said lug cleaning means engageable with adjacent portions of the shaft for effecting locking of the cleaning means to the shaft but adapted to be rendered inoperative with the imparting of stresses of a predetermined degree thereto whereby to allow of relative sliding movement between the cleaning means and the shaft, and means connected to the shaft operable whereby to effect rocking of the same for moving the lug cleaning means into and out of engagement between the wheel lugs.

14. A device of the character described, comprising in combination, a tractor frame, tractor wheels with lugs, a transverse mounting shaft, brackets secured to portions of the tractor frame in relatively spaced relation and each comprising bed plates having ways formed longitudinally thereof, carriage blocks slidably received in said ways, bearings pivotally connected to said carriage blocks and movable therewith, means engaging certain of the ends of said bed plates for limiting the extent of sliding movement of the carriage blocks and their respective bearings longitudinally of the bed plates, spring means interposed between the bearings and a fixed portion of each of said bed plates for yieldably retaining said bearings in certain predetermined positions with respect to the bed plates, said bearings rotatably and slidably supporting the mounting shaft, lug cleaning means mounted upon and splined to the opposite portions of said shaft for engagement between the tractor wheel lugs during rotation of the wheels, means on the lug cleaning means engageable with adjacent portions of the shaft for effecting the locking of the same to said shaft but adapted to be rendered inoperative with the imparting of stresses of a predetermined degree thereto whereby to permit of relative sliding movement between the cleaning means and the shaft, and means connected to said shaft for imparting rocking motion thereto whereby to move the lug cleaning means into and out of engagement between the wheel lugs.

In witness whereof I have hereunto set my hand.

CHARLES E. WEBBER.